United States Patent [19]

Sanstrom et al.

[11] Patent Number: 4,497,280
[45] Date of Patent: Feb. 5, 1985

[54] TIMER ACTUATED PET FEEDER

[76] Inventors: Grant H. Sanstrom; Beverly J. Sanstrom, both of P.O. Box 138, Parker, Wash. 98939

[21] Appl. No.: 568,886

[22] Filed: Jan. 9, 1984

[51] Int. Cl.³ .............................................. A01K 5/02
[52] U.S. Cl. .................................. 119/51.11; 119/56 R
[58] Field of Search ........................ 119/51.11, 56 R; 222/439, 448, 449, 450

[56] References Cited

U.S. PATENT DOCUMENTS 534,082  2/1895  Reeder ........................ 119/56 R X
4,256,054  3/1981  Hitchcock ...................... 119/51.11

Primary Examiner—Hugh R. Chamblee
Attorney, Agent, or Firm—Clarence A. O'Brien; Harvey B. Jacobson

[57] ABSTRACT

A vertically elongated housing is provided including a lower end upwardly and outwardly opening receptacle portion, an upper end fluent material storage hopper and an intermediate heighth discharge chute opening downwardly from the lower end of the storage hopper toward the receptacle portion. The discharge chute includes inversely openable and closable flow controlling gates spaced therealong whereby a given quantity of fluent granular material may be trapped between the gates and intermittently dispensed from the discharge chute into the receptacle portion responsive to timed actuation of a flow controlling gate operating mechanism.

9 Claims, 7 Drawing Figures

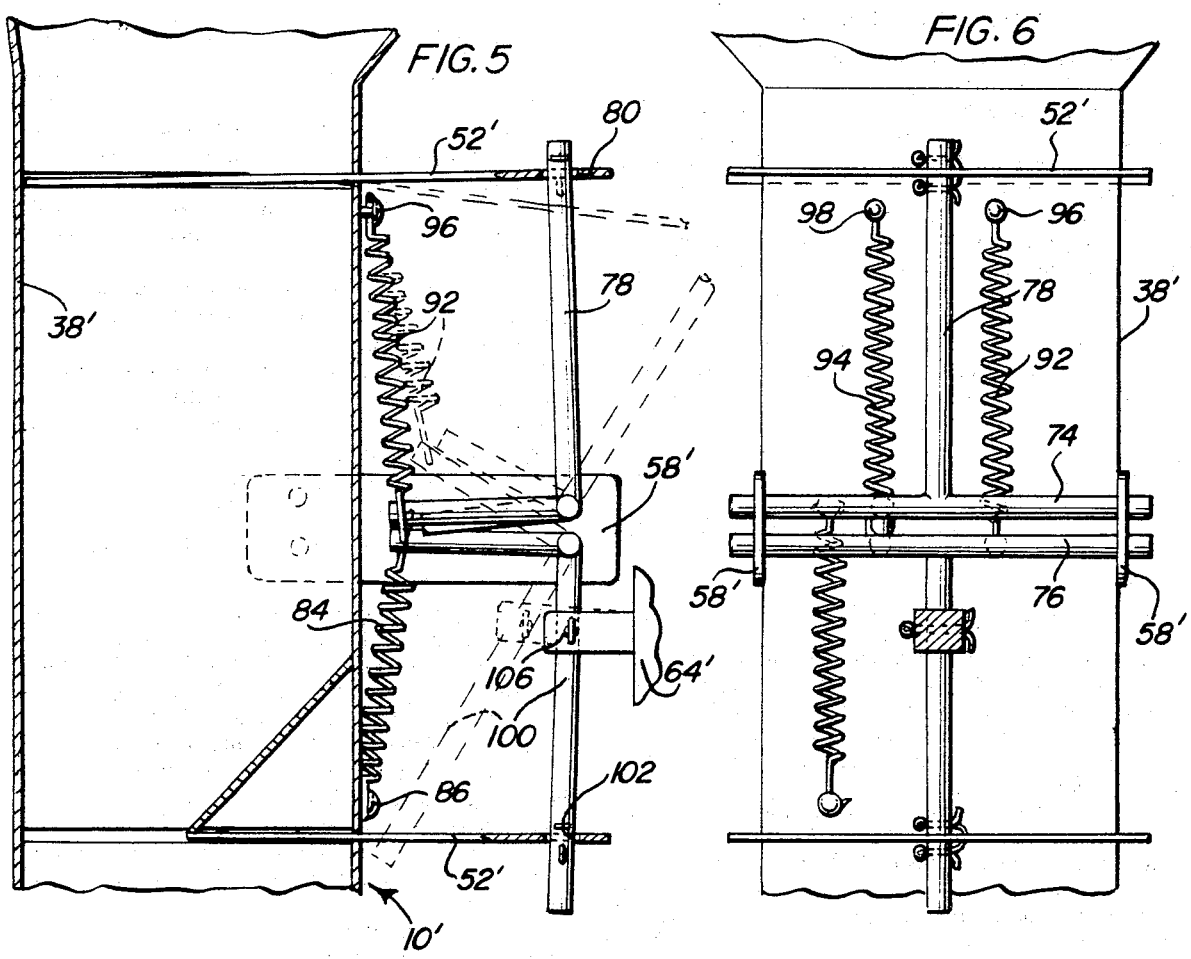
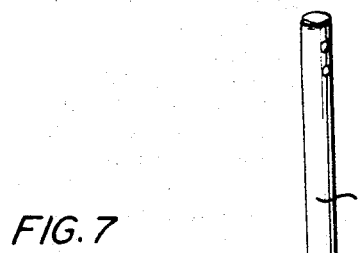

TIMER ACTUATED PET FEEDER

BACKGROUND OF THE INVENTION

Many persons have domestic pets in their homes but occasionally must be away from their homes for a day or more at a time. Such periods of absence from the home for as much as two weeks raises a problem as to how to feed pets of the canine or feline families. Many homeowners have fenced yards and have provided means whereby dogs may pass between their house and a fenced yard and most homeowners provide litter boxes for their cats. Accordingly, a day or more absence from the home presents only the problem of properly feeding and watering cats and/or dogs. Many different forms of automatic watering devices are presently marketed for domestic pets and therefore a need exists whereby the proper amount of food for a dog or cat may be dispensed in a timed manner into an appropriate food receptacle.

Examples of timed feed dispensing structures as well as other similar devices including some of the general structural and operational features of the instant invention are disclosed in U.S. Pat. Nos. 2,772,659, 3,578,209, 3,646,913 and 4,042,150.

BRIEF DESCRIPTION OF THE INVENTION

The pet feeder of the instant invention includes a vertically elongated housing including an upper hopper portion for receiving a large supply of dry dog or cat food and a lower feed receptacle from which a cat or dog may eat food dispensed thereinto. The feeder further includes a vertically elongated discharge chute for discharging fluent dry food from the hopper down into the receptacle and the discharge chute includes vertically spaced inversely operable food flow controlling gates. A timer actuated solenoid is provided for momentary inverse operation of the flow controlling gates and in this manner a proper amount of food disposed between the gates may be downwardly dispensed from the discharge chute into the food receptacle at predetermined timed invervals.

The main object of this invention is to provide a pet feeder which will be capable of dispensing predetermined quantities of fluent dry food into a receptacle from which a domestic pet such as a dog or cat may eat.

Another object of this invention is to provide a pet feeder whose dispensing function is under the control of an electric solenoid which may be actuated at predetermined timed intervals by a commercially available timing mechanism.

Yet another object of this invention is to provide a food dispenser which may be readily adapted to dispense varied amounts of food.

A further object of this invention is to provide a pet feeder which is reasonably portable and therefore which may be moved from one location to another, as desired.

A final object of this invention to be specifically enumerated herein is to provide a pet feeder in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a vertical sectional view similar to FIG. 3, but illustrating a second form of feeder;

FIG. 6 is an elevation view illustrating the second form as seen from the right side of FIG. 5; and FIG. 7 is a fragmentary enlarged perspective view of the operating linkage of the second form.

DETAILED DESCRIPTION OF THE INVENTION

Figure 1:
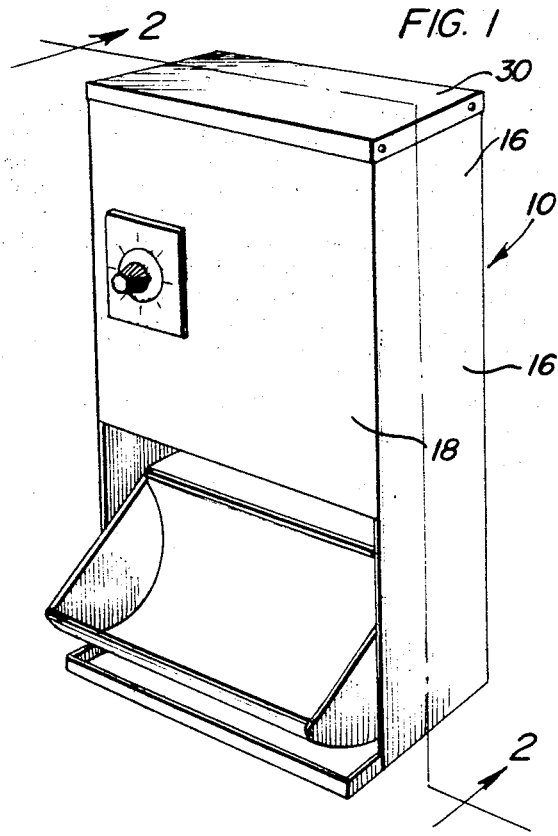
FIG. 1 is a perspective view of a first form of pet feeder.
Figure 2:
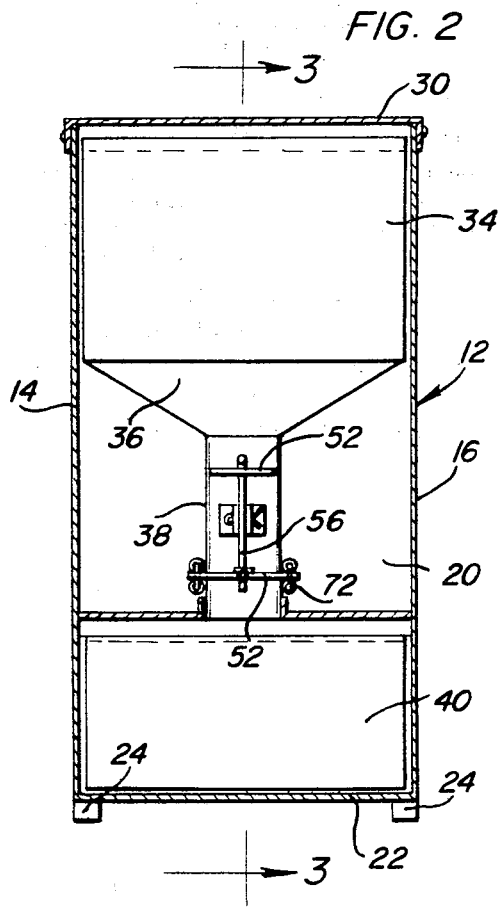
FIG. 2 is an enlarged vertical sectional view taken substantially upon the plane indicated by the section line 2—2 of FIG. 1.
Figure 3:
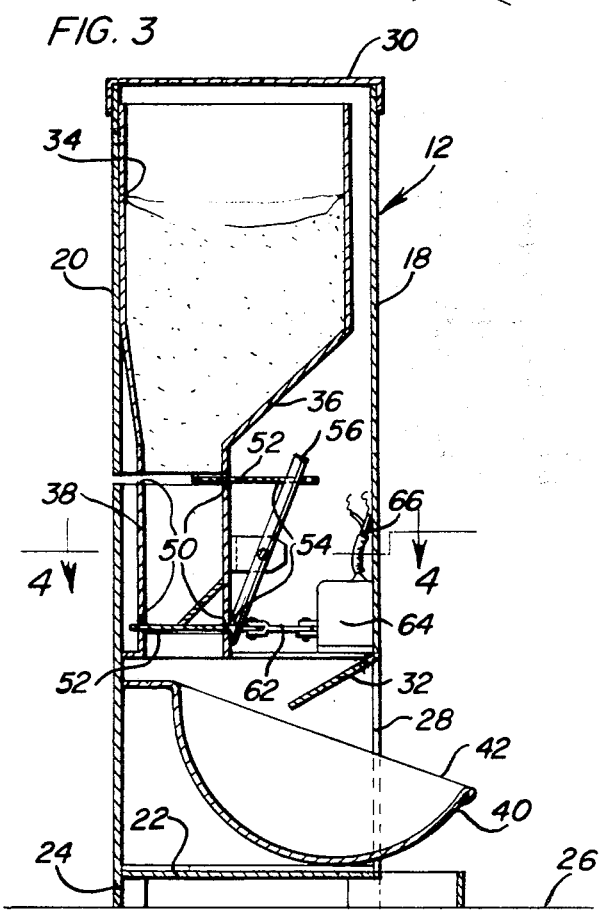
FIG. 3 is a vertical sectional view taken substantially upon the plane indicated by the section line 3—3 of FIG. 2.

Referring now more specifically to the drawings the numeral 10 generally designates the first form of pet feeder of the instant invention. The feeder 10 includes an elongated upright housing 12 having opposite side walls 14 and 16 and front and rear walls 18 and 20. The lower ends of the walls 14, 16, 18 and 20 are interconnected by a bottom wall 22 and the lower end of the housing 12 includes four depending corner feet 24 which project downwardly below the bottom wall 22 for support of the housing 12 from a suitable support surface 26 with the bottom wall 22 elevated above the surface 26.

The front wall 18 terminates downwardly a spaced distance above the bottom wall 22 and defines a forward access opening 28 in the lower end of the housing 12 and the upper end of the housing 12 is closed by a removable top wall 30.

The lower end of the front wall 18 includes an inwardly and downwardly inclined extension 32 for a purpose to be hereinafter more fully set forth and the interior of the upper portion of the housing 12 supports an upwardly opening hopper 34 therein immediately beneath the upper or top wall 30. The lower end portion of the hopper 34 tapers downwardly as at 36 and opens into the upper end of a generally rectangular upstanding discharge chute 38. A feeding receptacle 40 is positioned within the lower portion of the housing 12 below the lower end of the discharge chute 38 and with the receptacle 40 supported from the bottom wall 22 and including a forward portion 42 which projects outwardly through the opening 28.

The discharge chute 38 includes front and rear walls 44 and 46 interconnected by opposite side walls 48 and the front and rear walls 44 and 46 include vertically spaced slots 50 formed therein through which upper and lower horizontal flow controlling plates 52 are slidingly received. The forward marginal edges of the plates 52 project forward of the front wall 44 and have openings 54 formed therein through which the upper and lower ends of a lever rod 56 are loosely received. The center portion of the lever rod 56 is pivotally mounted between forwardly projecting flanges 58 as at 60 and the forward marginal edge of the lower plate 52 has one end of a connecting link 62 connected thereto. The other end of the link 62 is connected to the armature of a solenoid 64 and the solenoid 64 is provided with wires 66 whereby it may be electrically actuated by any suitable form of timing mechanism (not shown).

Figure 4:
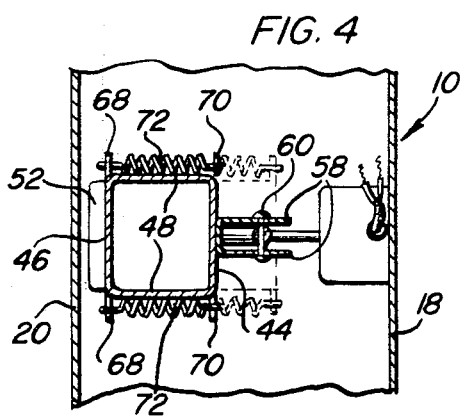
FIG. 4 is an enlarged horizontal sectional view taken substantially upon the plane indicated by the section line 4—4 of FIG. 3.

The rear wall 46 includes a pair of oppositely laterally outwardly projecting tabs 68 and the forward end of the lower plate 52 includes similar laterally outwardly projecting anchor tabs 70. An expansion spring 72 is operatively connected between each pair of corresponding tabs 68 and 70 and serve to yieldingly bias the lower plate 52 toward its rearmost position illustrated in solid lines in FIG. 4.

In operation, the hopper 34 may be filled with desirable fluent dry food and the solenoid 64 may be electrically connected via the conductors 66 to a suitable electrically operated timer for operation of the solenoid 64 at predetermined time intervals. Then, when the timer actuates solenoid 64 the amount of feed between the plates 52 will be discharged from the discharge chute 38 into the feed receptacle 40 and a new quantity of feed will be allowed to fall from the hopper 34 into the discharge chute 38 between the plates 52 as the upper and lower plates 52 are spring biased back toward their forwardmost and rearmost positions, respectively. In this manner, the desired quantity of dry feed will be dispensed to a pet at predetermined time intervals. The extension 32 serves to assure that feed being dispensed into the receptacle 40 will not be deflected outwardly of the forward end thereof and also to assist in properly positioning and protecting the head of a feeding animal projecting through the opening 28.

Referring now more specifically to the drawings the numeral 10' generally designates a second form of feeder constructed in accordance with the present invention. The second form of feeder includes an elongated upright housing (not shown) corresponding to the housing 12 as well as all of the other features of the first form of feeder supported from the housing 12. The second form of feeder 10' differs from the feeder 10 only in the actuating mechanism thereof for the upper and lower flow controlling plates 52' thereof which correspond directly to the plates 52 and are supported from a generally rectangular upstanding discharge chute 38' corresponding to the chute 38. The chute 38' includes opposite side forwardly projecting flanges 58' and a pair of upper and lower shafts 74 and 76 are oscillatably supported from the flanges 58'. The shaft 74 includes a central upright shank or rod 78 corresponding to the upper end of the rod 56 and the upper end of the rod 78 is received through an opening 80 formed through the front of the upper plate 52'. The shaft 74 includes a rearwardly projecting arm 82 adjacent one end thereof to which the upper end of an expansion spring 84 is connected, the lower end of the expansion spring 84 being anchored relative to the front of the chute 38' as at 86. Accordingly, the spring 84 downwardly yieldingly biases the rear end of the arm 82 and thus yieldingly biases the upper end of the rod 78 rearwardly in order to close the upper plate 52'.

The lower shaft 76 includes a pair of rearwardly projecting arms 88 and 90 and the lower ends of a pair of expansion springs 92 and 94 are anchored to the rear ends of the arms 88 and 90 while the upper ends of the expansion springs 92 and 94 are anchored relative to the chute 38' as at 96 and 98. Further, the center portion of the shaft 76 includes a depending shank or rod 100 whose lower end is received through an opening 102 formed in the forward end of the lower plate 52'. Further, from FIGS. 5 and 7 of the drawings it may be seen that the shaft 74 includes a second rearwardly projecting arm 104 which overlies and is abuttingly engageable with the arm 90 carried by the shaft 76.

In operation, the armature of the solenoid 64' corresponding to the solenoid 64 is connected to the rod 100 as at 106 and upon timed actuation of the solenoid 64' the arm 100 will be pulled forwardly from the phantom line position thereof illustrated in FIG. 5 to the solid line position of FIG. 5 thus causing the lower plate 52 to open. The springs 92 and 94 yieldingly resist oscillation of the shaft 76 to open the lower plate 52', but the solenoid 64' is sufficiently strong to overcome the biasing action of the springs 92 and 94. In addition, when the solenoid 64' is actuated to pull the lower end of the rod 100 forward from the phantom line position of FIG. 5 to the solid line position of FIG. 5 in order to open the lower plate 52', the arm 90 swings downwardly away from the arm 104 and the expansion spring 84 yieldingly biases the shaft 74 toward an angular position to swing the upper plate 52' to the closed position thereof illustrated in FIG. 5. Thus, feed within the hopper carried by the upper end of the chute 38' will be prevented from downward movement through the chute 38' into the area thereof defined between the upper and lower plates 52' and the feed within the chute 38' between the upper and lower plates 52' will fall downwardly through the chute 38' and past the lower plate 52' into the feeding receptacle (not shown) corresponding to the feeding receptacle 40. When actuation of the solenoid 64' is terminated, the springs 92 and 94 return the shaft 76 to the angular position thereof illustrated in phantom lines in FIG. 5 and with the rod 100 swung to a position with the lower plate 52 closed. In addition, inasmuch as the free end of the arm 104 overlies the free end portion of the arm 90, movement of the shaft 76 to the angular position thereof indicated by the phantom line representation of the rod 100 in FIG. 5 causes the free end portion of the arm 90 to upwardly displace the free end portion of the arm 104 from the solid line position of FIG. 5 to the phantom line position thereof illustrated in FIG. 5, even against the biasing action of the spring 84. Thus, the upper plate 52' is forwardly displaced to the open position thereof and feed from within the hopper supported from the upper portion of the chute 38 may fall downwardly into the interior portion of the chute 38' disposed between the closed lower gate 52' and the open upper gate 52'.

It may thus be seen that the solenoid 64' positively actuates only the lower plate 52' when the lattter is being shifted from the closed position thereof to the open position thereof and that the springs 92 and 94 serve to close the lower plate 52' and open the upper plate 52'. Further, the upper plate 52' is closed only by the spring 84 when the solenoid is actuated and the springs 92 and 94 close the lower plate 52' and simultaneously open the upper plate 52' when the solenoid is deactuated.

By the foregoing described structure a lost motion connection is provided between the actuators (comprising the solenoid 64 and the springs 92 and 94) for the lower plate 52' and the upper plate 52'. By providing such a lost motion connection, opening of the lower plate 52' cannot be prevented by jamming of feed in the upper portion of the chute 38' as the upper plate 52' moves toward a closed position. This is relatively unimportant when fine granular feed is being dispensed, but becomes quite important when large "bite size" feed is being dispensed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A pet feeder including an upright housing having a front wall provided with a lower opening formed therethrough in which to receive an upwardly opening receptacle, the upper portion of the interior of said housing defining an upwardly opening hopper, said hopper including a downwardly projecting discharge chute extending downwardly from the lower end thereof, the lower end of said discharge chute being disposed at an elevation for downward discharge of fluent material therefrom into said receptacle, vertically spaced portions of said chute including inversely openable and closable gate means operatively associated therewith for controlling the downward flow of fluent material from said hopper through and from the lower end of said chute, force means yieldingly biasing said gate means toward positions with the upper gate means open and the lower gate means closed, and timer actuatable electrically operated motor means operatively connected to said gate means for shifting said upper and lower gate means toward the closed and open positions, respectively, thereof, said motor means being operably connected to said lower gate means, only, for direct shifting thereof from the closed position toward the open position, said lower gate means including a lost motion connection with said upper gate means for positively opening said upper gate means responsive to closing of said lower gate means and allowing said lower gate means to open, under the control of said motor means, in advance of closing of said upper gate means under the influence of said force means.

2. The pet feeder of claim 1 including an upwardly opening fluent material receiving receptacle supported in the lower portion of said housing and projecting outwardly through said opening, said receptacle being disposed below the lower end of said chute for receiving fluent material discharged therefrom.

3. The pet feeder of claim 1 wherein said motor means comprises an electric solenoid.

4. The pet feeder of claim 1 wherein said force means includes first spring means connected to said upper gate means for closing the latter and second spring means connected to said lower gate means for closing the latter, said second spring means being stronger than said first spring means and thereby operative, through said lost motion connection, to close said lower gate means and also open said upper gate means against the biasing action of said first spring means.

5. The pet feeder of claim 1 wherein said gate means comprise horizontally shiftable partitions defining horizontal gate members shiftable transversely of said chute.

6. The pet feeder of claim 1 wherein the upper portion of said housing defines an access opening through which fluent material may be pourred into said hopper, and a removable closure for said access opening.

7. The pet feeder of claim 6 wherein said gate means comprise horizontally shiftable partition defining horizontal gate members shiftable transversely of said chute.

8. A fluent granular material dispenser including an upstanding chute including an upper inlet end for receiving fluent material from a supply thereof and a lower discharge and for intermittently discharging quantities of granular material therefrom, vertically spaced portions of said chute including inversely openable and closable upper and lower gate means operatively associated therewith for controlling the downward flow of fluent through and from the lower end of said chute, force means yieldingly biasing said gate means toward positions with the upper gate means open and the lower gate means closed, and timer actuated motor means operatively connected to said lower gate means for shifting siad lower gate means toward the open position, said force means including a lost motion connection with said upper gate means operative to open the latter, against the biasing action thereon to close the upper gate means, responsive to movement of the lower gate means to the closed position and further operative to allow gate means to open, under the influence of said motor means in advance of closing of said uper gate means.

9. A feeder including a hopper for receiving fluent material and provided with a lower downwardly discharging discharge chute, vertical spaced portions of said chute including inversely openable and closable gate means operatively associated therewith for controlling the downward flow of fluent material from said hopper through and from the lower end of said chute, force means yieldingly biasing said gate means toward positions with the upper gate means open and the lower gate means closed, timer actuatable electrically operated motor means operatively connected to said gate means for shifting said upper and lower gate means toward the closed and open positions, respectively, thereof, said motor means being operatively connected to said lower gate means, only, for direct shifting thereof from the closed position toward the open position, said lower gate means including a lost motion conection with said upper gate means for positively opening said upper gate means responsive to closing of said lower gate means and allowing said lower gate means to open, under the control of said motor means, in advance of closing of said upper gate means under the influence of said force means.

* * * * *